(12) United States Patent
Liu et al.

(10) Patent No.: US 9,317,676 B2
(45) Date of Patent: *Apr. 19, 2016

(54) IMAGE-BASED CAPTCHA EXPLOITING CONTEXT IN OBJECT RECOGNITION

(71) Applicant: Microsoft Technology Licensing, LLC, Redmond, WA (US)

(72) Inventors: Jia Liu, Beijing (CN); Bin Benjamin Zhu, Edina, MN (US); Qiujie Li, Nanjing (CN); Shipeng Li, Palo Alto, CA (US); Ning Xu, Changzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,083

(22) Filed: Jul. 8, 2013

(65) Prior Publication Data
US 2013/0298195 A1  Nov. 7, 2013

Related U.S. Application Data

(63) Continuation of application No. 12/709,311, filed on Feb. 19, 2010, now Pat. No. 8,483,518.

(51) Int. Cl.
*G06K 9/60* (2006.01)
*G06F 21/36* (2013.01)
(Continued)

(52) U.S. Cl.
CPC .......... *G06F 21/36* (2013.01); *G06F 17/30247* (2013.01); *G06T 7/0081* (2013.01); *G06T 11/60* (2013.01); *G06T 2207/20144* (2013.01); *G06T 2210/22* (2013.01)

(58) Field of Classification Search
CPC .................... G06F 17/30247; G06F 17/30256; G06F 17/30265; G06F 21/36; G06T 11/60; G06T 2207/20144; G06T 2210/22; G06T 7/0081

USPC ......... 382/100, 103, 164, 173, 282, 283, 298, 382/305; 707/709, 710
See application file for complete search history.

(56) References Cited

U.S. PATENT DOCUMENTS 5,191,612 A   3/1993   Katsuyama et al.
5,748,789 A   5/1998   Lee et al.
(Continued)

FOREIGN PATENT DOCUMENTS

WO   WO2009150655   12/2009

OTHER PUBLICATIONS

Ahn, et al., "CAPTCHA: Using Hard AI Problems for Security," Lecture Notes in Computer Science, 2003, vol. 2656/2003, retrieved at <<http://www.captcha.net/captcha_crypt.pdf>>, 18 pages.

(Continued)

*Primary Examiner* — Ali Bayat
(74) *Attorney, Agent, or Firm* — Steve Wight; Sandy Swain; Micky Minhas

(57) ABSTRACT

Techniques for an image-based CAPTCHA for object recognition are described. The disclosure describes adding images to a database by collecting images by querying descriptive keywords to an image search engine or crawling images from the Internet.

The disclosure describes generating the image-based CAPTCHA. The image is retrieved from the database, along with objects having significant values. An object is cropped from its image. The portion on the image where the object has been cropped is filled with image inpainting. The process obtains other objects from the database. The object is mixed among the other objects to from a set of candidate objects. A user is asked to select "the object" from the set of candidate objects that fits or matches the image. The image-based CAPTCHA evaluates whether a response, the selection, is from a human or a bot.

20 Claims, 9 Drawing Sheets

(51) Int. Cl.
  *G06F 17/30* (2006.01)
  *G06T 11/60* (2006.01)
  *G06T 7/00* (2006.01)

(56) References Cited

U.S. PATENT DOCUMENTS

| | | | |
|---|---|---|---|
| 5,999,664 A * | 12/1999 | Mahoney et al. | 382/305 |
| 6,999,623 B1 | 2/2006 | Yamaoka et al. | |
| 7,043,094 B2 | 5/2006 | Thomas et al. | |
| 7,170,632 B1 | 1/2007 | Kinjo | |
| 7,505,946 B2 | 3/2009 | Chellapilla et al. | |
| 7,624,277 B1 | 11/2009 | Simard et al. | |
| 8,397,275 B1 | 3/2013 | Magdsick | |
| 8,627,419 B1 * | 1/2014 | VanDeMar | 726/5 |
| 2003/0006973 A1 | 1/2003 | Omura et al. | |
| 2005/0074169 A1 | 4/2005 | Filatov et al. | |
| 2005/0147281 A1 | 7/2005 | Wang et al. | |
| 2005/0246775 A1 | 11/2005 | Chellapilla et al. | |
| 2008/0063279 A1 | 3/2008 | Vincent et al. | |
| 2008/0066014 A1 | 3/2008 | Misra | |
| 2008/0127302 A1 | 5/2008 | Qvarfordt et al. | |
| 2008/0133676 A1 | 6/2008 | Choisser et al. | |
| 2008/0317357 A1 | 12/2008 | Steinberg et al. | |
| 2009/0080783 A1 | 3/2009 | Hirohata | |
| 2009/0096808 A1 | 4/2009 | Winn et al. | |
| 2009/0138723 A1 | 5/2009 | Nyang et al. | |
| 2009/0187986 A1 | 7/2009 | Ozeki | |
| 2009/0232351 A1 | 9/2009 | Kagitani et al. | |
| 2009/0313694 A1 | 12/2009 | Mates | |
| 2009/0328150 A1 | 12/2009 | Gross | |
| 2010/0046837 A1 * | 2/2010 | Boughorbel | 382/173 |
| 2010/0077210 A1 | 3/2010 | Broder et al. | |
| 2010/0183217 A1 | 7/2010 | Seung et al. | |
| 2011/0208716 A1 | 8/2011 | Liu et al. | |
| 2011/0255795 A1 | 10/2011 | Nakamura | |
| 2011/0283346 A1 | 11/2011 | Li et al. | |
| 2012/0167204 A1 | 6/2012 | Akka | |

OTHER PUBLICATIONS

Ahn, et al., "Telling Humans and Computers Apart (Automatically) or How Lazy Cryptographers do AI," Communications of the ACM, vol. 47 Issue 2, Feb. 2004, 12 pages.
Amazon Mechanical Turk, retrieved on Nov. 25, 2010 at <<https://www.mturk.com/mturk/welcome.>>, 1 page.
Baird, et al., "Human Interactive Proofs and Document Image Analysis," Proceedings 5th IAP International Workshop on Document Analysis Systems, Aug. 2002, pp. 507-518.
Bursztein, et al., "How Good are Humans at Solving CAPTCHAs? A Large Scale Evaluation", 2010 IEEE Symposium on Security and Privacy (SP), May 2010, 15 pages.
Chandavale, et al., "Algorithm to Break Visual CAPTCHA", Second International Conference on Emerging Trends in Engineering and Technology, Dec. 2009, 5 pages.
Chellapilla, et al., "Building Segmentation Based Human-friendly Human Interaction Proofs (HIPs)," Lecture Notes in Computer Science, vol. 3517/2005, May 2005, 27 pages.
Chellapilla, et al., "Computers Beat Humans at Single Character Recognition in Reading based Human Interaction Proofs," 2nd Conference on Email and Anti-Spam (CEAS), Jul. 2005, 8 pages.
Chellapilla, et al., "Designing Human Friendly Human Interaction Proofs (HIPs)," CHI 2005, Apr. 2005, 10 pages.
Chellapilla, "Using Machine Learning to Break Visual Human Interaction Proofs (HIPs)," Advances in Neural Information Processing Systems 17, Neural Information Processing Systems (NIPS-2004), Dec. 2004, 8 pages.
Ferzli et al., "A Captcha Based on the Human Visual Systems masking Characteristics", IEEE International Conference on Multimedia and Expo, Jul. 2006, pp. 517-520.
Fischer et al., "Visual CAPTCHAs for Document Authentication", 8th IEEE International Conference on Multimedia and Expo, Jul. 2006, pp. 471-474.
Ince et al., "Designing Captcha Algorithm: Splitting and Rotating the Images against OCRs", Proceedings of the 2008 Third International Conference on Convergence and Hybrid Information Technology (ICCIT), vol. 02, Nov. 2008, pp. 596-601.
International Search Report, Mailed date Jan. 19, 2012, Application No. PCT/US2011/03574, 3 pages.
Kluever, "Breaking the PayPal HIP: A Comparison of Classifiers", retrieved at <<https://ritdml.rit.edu/bitstream/handle/1850/7813/KKlueverTechPaper05-20-2008.pdf?sequence=1>>, May 20, 2008, pp. 1-17.
Mori, et al., "Recognizing Objects in Adversarial Clutter: Breaking a Visual CAPTCHA," 2003 IEEE Computer Society Conference on Computer Vision and Pattern Recognition, vol. 1, Madison Wisconsin, Jun. 2003, 8 pages.
Moy, et al., "Distortion Estimation Techniques in Solving Visual CAPTCHAs," Proceedings of the 2004 IEEE Computer Society Conference on Computer Vision and Pattern Recognition (CVPR'04), Jun.-Jul. 2004, 6 pages.
Office action for U.S. Appl. No. 13/091,964, mailed on Nov. 5, 2013, Zhu, et al., "Human User Verification", 22 pages.
Office action for U.S. Appl. No. 13/091,964, mailed on Jun. 17, 2013, Zhu et al., "Human User Verification", 17 pages.
PWNtcha—Caca Labs, retrieved on Nov. 26, 2010 at <<http://sam.zoy.org/pwntcha/>>, 4 pages.
ReCaptcha, retrieved on Nov. 26, 2010 at <<http://recaptcha.net/>>, 1 pages.
Rusu et al., "A Human Interactive Proof Algoritm Using Handwriting Recognition", Proceedings of the Eighth International Conference on Document Analysis and Recognition, Aug.-Sep. 2005, 5 pages.
Rusu, "Exploiting the Gap in Human and Machine Abilities in Handwriting Recognition for Web Security Application", <<Retrieved at http://www.cedar.buffalo.edu/~govind/amalia_thesis.pdf>>, Aug. 2007, 141 pages.
Rusu, et al., "Leveraging Cognitive Factors in Securing WWW with CAPTCHA," Proceedings of the 2010 USENIX conference on Web application development, Jun. 2010, 10 pages.
Rusu et al., "The Influence of Image Complexity on Handwriting Recognition", Tenth International Workshop on Frontiers in Handwriting Recognition, Oct. 2006, 5 pages.
Websense. Captcha Revisited: Microsoft's "Revised" CAPTCHA Busted by Spammers for Mass-mailing Operations, retrieved on Nov. 25, 2010, at <<http://securitylabs.websense.com/content/Blogs/3195.aspx>>, 1 page.
Websense. Google's CAPTCHA Busted in Recent Spammer Tactics, retrieved on Nov. 25, 2010, at <<http://securitylabs.websense.com/content/Blogs/2919.aspx#>>, 1 page.
Yahoo's CAPTCHA Security Reportedly Broken. Information Week, retrieved on Nov. 26, 2010 at <<http://www.informationweek.com/news/internet/webdev/showArticle.jhtml?articleID=205900620>>, 3 pages.
Yan, et al., "A Low-cost Attack on a Microsoft CAPTCHA," Proceedings of the 15th ACM conference on Computer and communications security, Oct. 2008,19 pages.
Yan, et al., "Breaking Visual CAPTCHAs with Naive Pattern Recognition Algorithms," 23rd Annual Computer Security Applications Conference, Dec. 2007, pp. 279-291.
Zhang, et al., "A Fast Parallel Algorithm for Thinning Digital Patterns," Communications of the ACM, vol. 27 Issue 3, Mar. 1984, 4 pages.
Ahn et al., "The CAPTCHA web page", The Official CAPTCHA Site, 2000, 1 page, retrieved on Apr. 19, 2010 at <<http://www.captcha.net>>, 4 pages.
Bagon, et al., "What is a Good Image Segment? A Unified Approach to Segment Extraction", Lecture Notes in Computer Science vol. 5305, Proceedings of European Conference on Computer Vision: Part IV, Oct. 2008, 14 pages.
Chanamolu, "An Orientation Based Image CAPTCHA", retrieved on May 27, 2010 at <<http://etd.ohiolink.edu/send-pdf.cgi/Chanamolu%20Yashwanth.pdf?osu1243904515>>, Ohio State University, Master's Thesis, 2009, pp. 1-58.

(56) References Cited

OTHER PUBLICATIONS

Cheng, et al., "Object-based Place Recognition and Loop Closing with Jigsaw Puzzle Image Segmentation Algorithm", IEEE International Conference on Robotics and Automation, May 2008, pp. 557-562.

Chew et al., "Image Recognition CAPTCHAs", Proceedings of the 7th International Information Security Conference (ISC 2004), Sep. 2004, pp. 268-279.

Datta et al., IMAGINATION: A Robust Image-based CAPTCHA Generation System, 13th ACM International Conference on Multimedia, Nov. 2005, 4 pages.

Datta, et al., "Exploiting the Human-Machine Gap in Image Recognition for Designing CAPTCHAs", IEEE Press, Transactions on Information Forensics and Security, vol. 4, No. 3, Apr. 2009, pp. 504-518.

Deng, et al., "Unsupervised Segmentation of Color-Texture Regions in Images and Video", IEEE Transactions on Pattern Analysis and Machine Intelligence, vol. .23, No. 8, Aug. 2001, pp. 800-810.

Elson et al., "Asirra: A CAPTCHA That Exploits Interest-Aligned Manual Image Categorization", 14th ACM Conference on Computer and Communications Security (ACM CCS '07), Oct.-Nov. 2007, 9 pages.

Golle, "Machine Learning Attacks Against the Asirra CAPTCHA", ACM, Proceedings of Conference on Computer and Communications Security (CCS), Oct. 2008, pp. 535-542.

Gossweiler et al., "What's Up CAPTCHA? A CAPTCHA Based on Image Orientation", 18th International Conference on World Wide Web (WWW 2009), Apr. 2009, 10 pages.

Liu, et al., "Learning to Detect a Salient Object", IEEE Computer Society, Conference on Computer Vision and Pattern Recognition (CVPR), Jun. 2007, pp. 1-8.

Office action for U.S. Appl. No. 12/709,311, mailed on Oct. 25, 2012, Liu et al., "Image-Based CAPTCHA Exploiting Context in Object Recognition", 6 pages.

Robinson, "Up to the Challenge: Computer Scientists Crack a Set of AI-based Puzzles", Society for Industrial and Applied Mathematics, Nov. 2002, pp. 1-6.

Rui et al., "ARTiFACIAL: Automated Reverse Turing test using FACIAL features" J. Multimedia Syst., vol. 9, No. 6, Jun. 2004, pp. 493-502.

Rui, et al., "Artifacial: Automated Reverse Turing Test Using Facial Features", Microsoft Research, Microsoft Corporation, Technical Report MSR-TR-2003-48, Apr. 2003, pp. 1-12.

Sun, et al., "Image Completion with Structure Propagation", ACM, International Conference on Computer Graphics and Interactive Techniques, Los Angeles, CA, Jul.-Aug. 2005, pp. 861-868.

Torralba, et al., "80 million tiny images: a large dataset for non-parametric object and scene recognition", IEEE Transactions on Pattern Analysis and Machine Intelligence, vol. 30, No. 11, Nov. 2008, pp. 1958-1970.

"Yuniti", retrieved at <<http://www.yuniti.com/register.php>>, YUNiTi, May 2010, 1 page.

Office action for U.S. Appl. No. 13/091,964, mailed on Apr. 11, 2014, Inventor Zhu et al., "Human User Verification", 18 pages.

Office action for U.S. Appl. No. 13/091,964, mailed on Oct. 16, 2014, Zhu, et al., "Human User Verification", 24 pages.

Office action for U.S. Appl. No. 13/091,964, mailed on Mar. 13, 2015, Zhu et al., "Human User Verification", 23 pages.

\* cited by examiner

IMAGE-BASED CAPTCHA EXPLOITING CONTEXT IN OBJECT RECOGNITION

CROSS REFERENCE TO RELATED APPLICATIONS

This patent application is a continuation of co-pending, commonly owned U.S. patent application Ser. No. 12/709,311, filed on Feb. 19, 2010, entitled "Image-Based CAPTCHA Exploiting Context in Object Recognition", which application is hereby incorporated in its entirety by reference.

BACKGROUND

A user utilizing a computing device often accesses internet websites for a variety of reasons. The internet websites provide services and benefits to the general public. However, the internet websites have come under attack. The problem is that the power in computing devices enables them to send hundreds or thousands of requests to major email service providers and attempts to access private websites, without human intervention.

The computing device's ability to demonstrate intelligence has been described by a Turing Test, based on a human differentiating between a computing device and a human. A modification of the Turing Test reversing the roles is the Reverse Turing Test (RTT), based on a computer differentiating between a computing device and a human. Based on the RTT scenario, Completely Automated Public Turing Tests to Tell Computers and Humans Apart (CAPTCHA), also known as Human Interactive Proof (HIP), was developed to ask a user to complete a simple challenge-response test generated and graded by the computing device to determine if the user is a human or a computing device. The test, CAPTCHA, should be relatively easy for humans to pass but difficult for automatic computer programs (i.e., bots) to pass.

CAPTCHAs have been proposed or deployed in applications. Traditionally, CAPTCHAs are based on text in which characters, typically English letters and numbers, are properly arranged and sophisticatedly distorted to prevent bots from segmenting the image of the text into individual characters and recognizing them. Conventional text-based CAPTCHAs are easy to generate and to grade, intuitive to humans, independent of different cultures and education backgrounds, and scalable to fit a large range of applications. Early approaches focus on disabling bots from recognizing characters in a CAPTCHA. However, research results show that computers are very good, better than humans, at recognizing single characters, even if these characters are highly distorted. Modern text-based CAPTCHAs rely on the difficulty of character segmentation rather than individual character recognition. With advances of computing technologies and segmentation algorithms, the gap between humans and bots has been increasingly narrowed. Conventional text-based CAPTCHA would eventually be unsuitable as a reverse Turing test: it would be too easy to prevent bots from passing the test or too hard for humans to recognize the characters. Alternative solutions to text-based CAPTCHAs are needed.

There have been efforts to develop non-text-based CAPTCHAs. A problem in designing non-text based CAPTCHAs is the difficulty in building a database with a sufficiently large set of classified, high-entropy entries. Building a large database that meets deployment requirements is expensive and very labor intensive. Another problem is that the database may not add new entries quickly and may not add a substantial amount of entries. After generating CAPTCHAs for a period of time, the entries in the database may be exhausted. Thus, not having new CAPTCHAs may cause repeatedly use of the previously used entries in the database, resulting in reduced security.

Thus, there is a need to address the afore-mentioned problems for CAPTCHAs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes an image-based CAPTCHA for object recognition, for example, to provide access to content for a wide range of online services and applications. The disclosure describes adding images to an image database, generating the image-based CAPTCHA, and presenting the image-based CAPTCHA to a user. An image has been segmented into objects and the objects are assigned a value. The objects with significant values are identified for the images and added to the database. The image and its segmented objects are randomly retrieved from the image database. An object is selected from the image and cropped from the image. The process includes filling a region on the image, where the object has been cropped, with image inpainting by using the remaining part of the image or a set of images. Then, the process obtains a number of other objects, that are similar to the object, from the image database. The process includes presenting the image and a set of candidate objects on a user interface on a display.

In another aspect, the disclosure describes implementing the image-based CAPTCHA. The process receives input to the user interface indicating an item has been selected from the set of candidate objects and the location of the selected item against the displayed image. The process evaluates whether the selected item does not fit or fits in the image: when the selected item does not fit as being part of the image, it is presumed a response is from a computer; or when the selected item fits as being part of the image, it is presumed the response is from a human.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
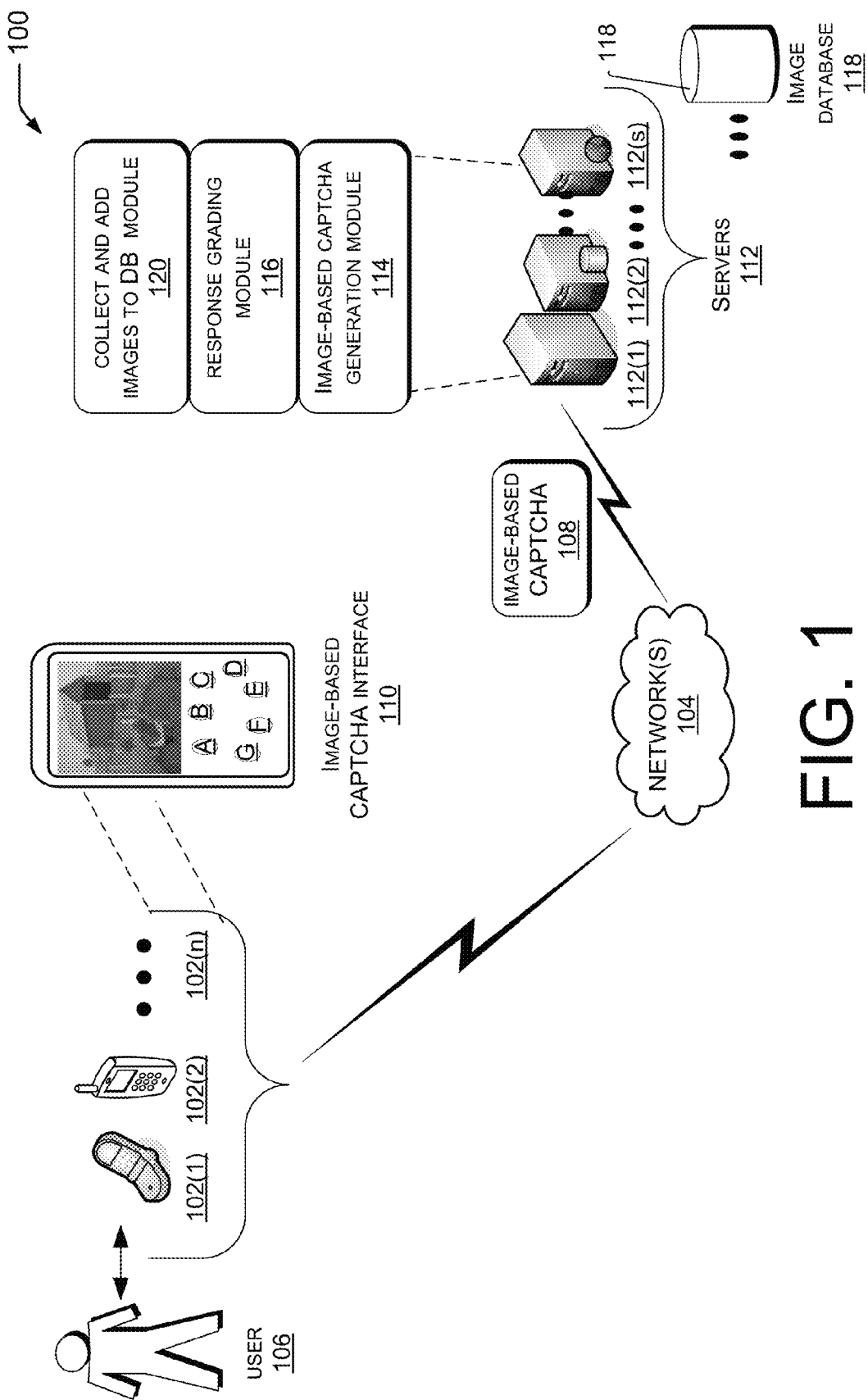
FIG. 1 is a schematic diagram showing an exemplary environment for implementing an image-based CAPTCHA for object recognition on computing devices.

This disclosure is directed to an image-based CAPTCHA, and is shown and described in the context of object recognition for an online application or service. As discussed above, conventional text-based CAPTCHA may not always provide an effective way of implementing security for online applications or services designated for human users, such as Web email, financial, and confidential information on servers. For example, characters in a text-based CAPTCHA may be highly distorted to prevent bots from recognizing them, resulting in difficulty even for human users to visually identify the characters. Moreover, with advances of computing technologies and character segmentation and recognition algorithms, conventional text-based CAPTCHAs may not be able to readily distinguish whether a response is from a computing device or a human.

This disclosure describes using an algorithm to add images to an image database. The algorithm performs operations, such as collecting images in an automatic manner based at least in part on image crawling or an image search engine. The process also includes segmenting images into objects and assigning a value (e.g., an estimation of significance that an object is perceived by humans) to each of the objects segmented. Significant objects are then identified for each image, and stored with the image in the image database. These items stored in the database are to be used for future generation of image-based CAPTCHAs.

This disclosure also describes implementing security based at least in part on the image-based CAPTCHAs for access to online services, applications, and the like. The image is randomly retrieved from the image database, along with its significant objects. An object is selected from the set of significant objects of the selected image and cropped from the image. The generating process includes filling a region on the image, where the object has been cropped, with image inpainting by using the remaining part of the image or a set of images. Then, the process obtains a number of other candidate objects, that are similar to the object, from the image database. The process includes presenting the image and a set of candidate objects, which includes the object and the other candidate objects, on a user interface on a display.

This disclosure also describes various techniques for managing security to determine whether the response for the image-based CAPTCHA is from a human or from a bot. The computing device of the user may visually present a representation of the image-based CAPTCHA on the user interface. This visual representation allows the user to provide the response for the image-based CAPTCHA and to verify that the correct object has been selected and possibly further verify that the selected object has been placed at the correct location of the image for the object recognition.

The image-based CAPTCHA described herein is not limited to online email applications or services, however, and applies to other contexts and environments. Alternatively, applications and services may include bank or credit accounts, salary and/or retirement accounts, online voting, tax information, access to confidential documents, data, graphs, photos, multimedia (e.g., text, audio, images, animation, video), games, online chat records, social networking profiles, postings, and the like. While aspects of described techniques can be implemented in any number of different computing systems, environments, and/or configurations, implementations are described in the context of the following exemplary computing environment. By way of example and not limitation, the image-based CAPTCHA described herein may be employed to stop automated postings to blogs, forums, wikis, in the form of advertisements, harassments, or vandalisms.

Illustrative Environment

FIG. 1 is a block diagram of an exemplary environment 100, in which online applications or services may be accessed from a web browser on a computing device. The environment 100 includes exemplary computing devices 102(1), 102(2), 102(n), which may take a variety of forms, including, but not limited to, a portable handheld computing device (e.g., a cellular phone 102(1), a smart phone 102(2), a personal digital assistant), a laptop computer, a desktop computer, a media player, a digital camcorder, an audio recorder, a camera, or any other device capable of connecting to one or more network(s) 104 to access online services. The exemplary computing devices 102(1), 102(2), 102(n) may be used by a user 106 to connect to one or more network(s) 104.

The network(s) 104 represents any type of communications network(s), including wire-based networks (e.g., cable), wireless networks (e.g., cellular, satellite), cellular telecommunications network(s), and IP-based telecommunications network(s) (e.g., Voice over Internet Protocol networks). The network(s) 104 may also include traditional landline or PSTN network(s), or combinations of the foregoing (e.g., Unlicensed Mobile Access or UMA networks, the circuit-switched telephone networks or IP-based packet-switch networks).

In the illustrated example, the user 106 using the computing device 102 accesses online applications or services via the network 104 and initially encounters an image-based CAPTCHA 108. The image-based CAPTCHA 108 implements security for the online applications or services. The image-based CAPTCHA 108 provides security for an array of resources available via the network(s) 104 and may include a plurality of network service providers, email service providers, database providers, online merchants, internet portals, web sites, and the like.

Each of the computing devices 102 may present an image-based CAPTCHA user interface 110 on a display screen, such as a CRT, flat LCD screen, or other display types. The image-based CAPTCHA user interface 110 shows the image-based CAPTCHA 108 with an image along with a set of candidate options concurrently on a screen in predefined areas or regions. The user interface 110 further supports simple drag-n-drop functionality to move an item selected from the set of candidate objects to and from the areas or regions of the image, and merges the selected object with the image to display to the user 106. A detailed discussion of the user interface is described below with reference to FIGS. 2-3.

The environment 100 includes the one or more servers 112(1), 112(2), . . . , 112(s) which may be a representative set of servers that is accessible via the network(s) 104. The servers 112 may be independent servers, or a collection of servers that are configured to perform larger scale functions (e.g., a server farm or a datacenter) accessible by the network(s) 104. In the illustrated example, the servers 112 represent private multiple content servers to implement functionalities, such as send, receive, route, store, detect, track, or otherwise manage content for the computing device 102. The servers 112 may be administered or hosted by a network service provider that provides online applications and/or services to and from the computing device 102. The servers 112 may include, but is not limited to an image database, a content management server, an application server, a database server, a file server, a communications server, and the like.

The servers 112 may include an image-based CAPTCHA generation module 114 and an image-based CAPTCHA response grading module 116, which combined together represent functionality to perform security operations by providing a challenge-response test. The generation module 114 and the grading module 116 may run on different servers of 112 (1), 112(2), . . . , 112(*s*). The image-based CAPTCHA generation module 114 generates an image-based CAPTCHA 108 to send to a computing device 102 to display, and the response grading module 116 determines whether a response to the image-based CAPTCHA 108 is from the bot or the human. A bot is presumed to be unable to solve the image-based CAPTCHA 108. Thus, if the response to the image-based CAPTCHA 108 is correct, the image-based CAPTCHA response grading module 116 presumes the response is from the human.

In the image-based CAPTCHA 108 described herein, an image is presented along with the set of candidate objects in the user interface 110. The image-based CAPTCHA 108 requests a user to select an item from the set of candidate objects. The request is identify the candidate object that fits or matches the context around the filled region in the image. The image-based CAPTCHA response grading module 116 evaluates whether the item selected from the set of candidates is correct or not, and can further check if the selected item has been placed at the correct position that fits the surrounding context such that the combined image appears as "the image" in the image-based CAPTCHA 108. If the item selected is the correct object that is placed at the location that fits the image, the image-based CAPTCHA response grading module 116 determines that the response is correct and presumes the user is human. However, if the item selected is a wrong object or is placed at a wrong position that does not fit the image, the image-based CAPTCHA response grading module 116 presumes the response has been generated by an automatic computer program, i.e., a bot. In an implementation, the image-based CAPTCHA generation module 114 and the image-based CAPTCHA response grading module 116 executing at the servers 112(1)-112(*s*) provides security for online applications and/or services via the network(s) 104, by granting or denying access to the services and applications, and the like. Thus, as illustrated, the image-based CAPTCHA modules 114 and 116 are executing at the servers 112(1)-112(*s*) to serve CAPTCHA tests to the computing device 102 with the User Interface (UI) functionality described herein.

The image-based CAPTCHA generator module 114 may provide the imaged-based CAPTCHA 108 in response to user requests for applications or services, or may present the image-based CAPTCHA 108 on a pre-determined basis, such as during operation of the application or the service when a session expires. During these time out sessions, a new image-based CAPTCHA is presented to enhance security.

Also shown in FIG. 1 is an image database 118 that may be included as part of the servers 112 or as a separate server that operates in conjunction with the servers 112. The database 118 is secure to prevent unauthorized access, if there is authorization, then access to the database to retrieve images is granted. Also shown is a collect and add image module 120 that works in operation with the image database 118. The collect and add image module 120 basically performs functions, such as collecting images and adding images to the image database 118 in an automatic manner. Since the images in the image database 118 do not need to be labeled, the images may be added in a fully automatic manner.

The generator module 114, the response grading module, and the collect and add image module 120 may operate on separate servers or operate on the same server 112. In another implementation, the services and/or applications that the image-based CAPTCHA 108 provides security for, may operate on separate servers from the modules.

Exemplary Image-Based User Interfaces

Figure 2:
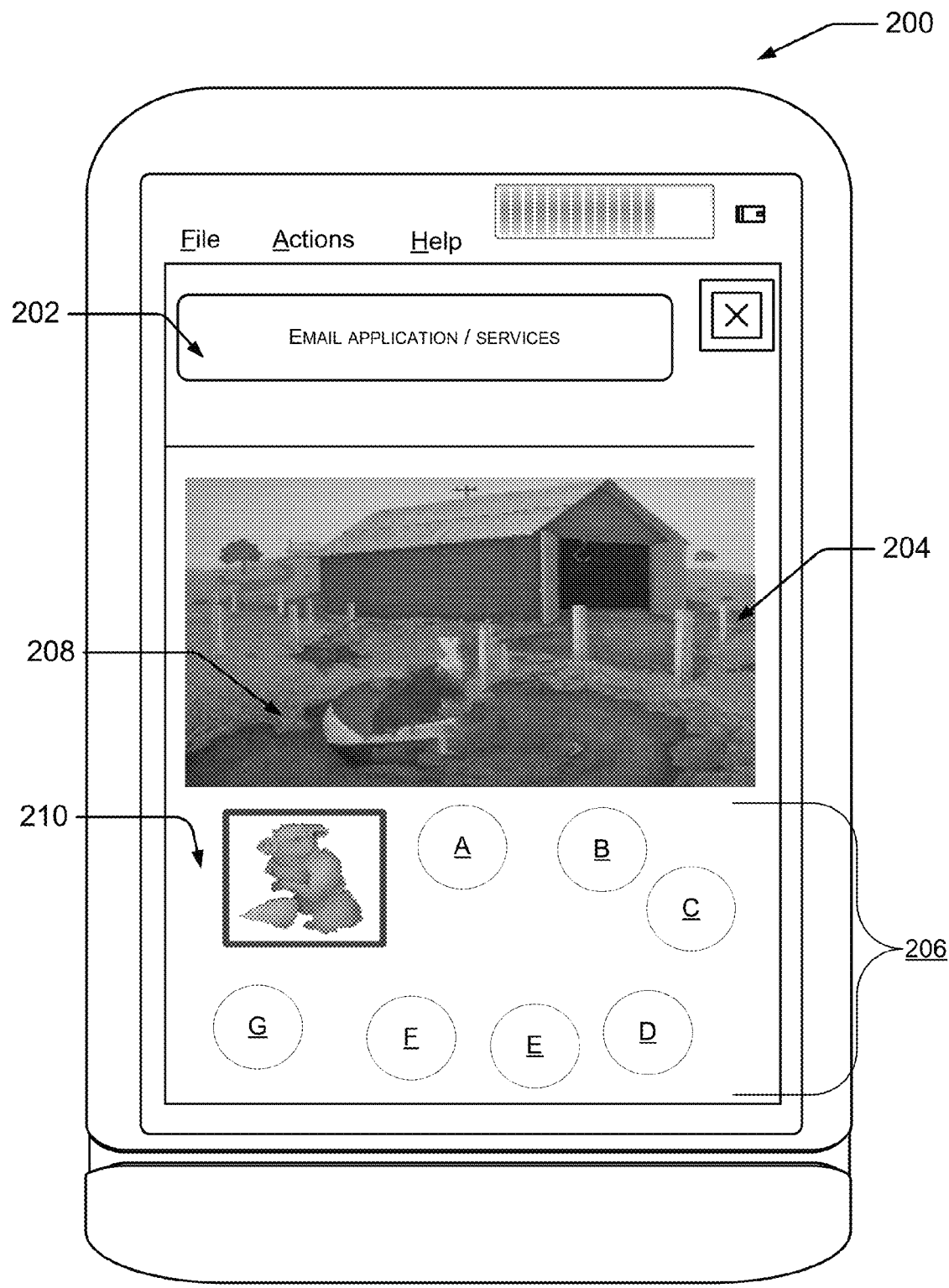
FIG. 2 is a schematic diagram showing an exemplary user interface on a computing device for presenting the image-based CAPTCHA for object recognition, in the environment of FIG. 1.
Figure 3:
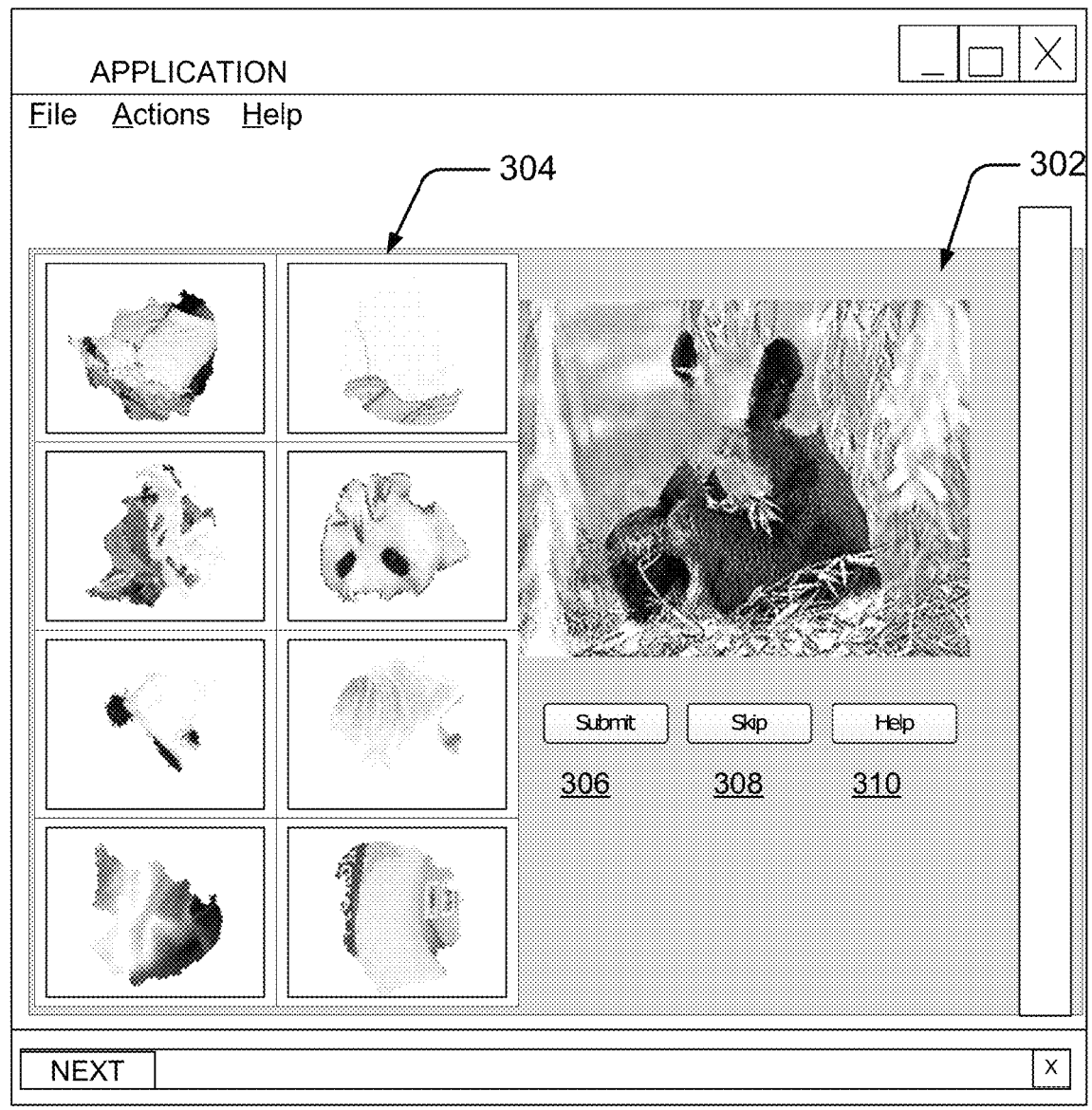
FIG. 3 is a schematic diagram showing an exemplary user interface on a computing device for implementing the image-based CAPTCHA for object recognition, in the environment of FIG. 1.

FIGS. 2 and 3 illustrate exemplary user interfaces that may be presented on the computing device 102. Some computing devices have alpha-numeric keypads, mouse, other forms of input and display, and large touch-screen interface. Other types of user interfaces may be used if other types of computing devices are used.

The information contained in the image may be classified into two types: low-level features and semantics. Low-level features are information, which has little to do with human perception or understanding. Computers are typically good at extracting low-level features from the image. Semantics are information that associates human interpretation of the image. For example, this may occur by identifying the semantically meaningful objects contained in an image, and the ability to understand the relationships of the objects. Low-level features are typically unique, meaning that the same low-level features would be generated when different computers perform the task or the same computer performs the task at different times. Semantics typically lacks of uniqueness. Different semantic meanings may be generated when the same image is perceived by different people or by the same person at different times. The gap between low-level features and semantic meanings may be exploited in designing the image-based CAPTCHA 108.

FIG. 2 shows an exemplary user interface 200 used by the user 106 to access online applications or services over the network 104. In this example, the user interface 200 includes a bar 202 to contain information of the application and/or the service that the user 106 is currently using, such as accessing email. In the exemplary user interface 200, the image-based CAPTCHA 108 is separated in a horizontal division. The user interface 200 shows two areas or regions on the display, a first region with the image at 204, a form, and a second region with the set of candidate objects at 206.

The user interface 200 also shows the object cropped 208 from the image, a pig. Initially, humans solving the image-based CAPTCHA 108 may find or see the inpainted region as being unnatural or incomprehensible sementically. Then the surrounding context of the inpainted region is compared with each of the candidate objects to find a best match. The selected object can further be placed at the position that matches the surrounding context, with the composite image forming a semantically meaningful image.

Furthermore, the user interface 200 shows the set of candidate objects 206 arranged in a carousel manner. The candidate objects 206 are presumed to be similar in the low-level features (i.e., what bots can compare) to the object cropped out portion 208 of the image 204. For example, some of the candidate objects 206 are shown as circles but in reality would be similar to the cropped out portion. The set of m candidate objects may be generated by the image-based CAPTCHA generator module 114 on the server 112. The value of m is typically in the range of eight to twelve candidate objects for the user 106 to choose from in the set of candidate objects. The terms object, cropped object, and detached object are used interchangeably to describe the object that has been cropped from the image and that fits or matches the image for the image-based CAPTCHA 108.

In generating the image-based CAPTCHA 108, an algorithm selects a visual object and crops the object from its image. The region left by the cropping operation is filled with image inpainting that leaves hints, such as unnaturalness that humans may perceive to identify the cropped region, but bots are unable to identify. Based on the context surrounding the unnatural region in the inpainted image 204, the human may recognize the pig has been cropped from the farm image. Typically, object recognition is a difficult problem in computer vision.

The detached object, may be outpainted if needed to hide the information that the object aligns with some image boundary or boundaries that bots might otherwise exploit to deduce the detached object, is used to search the image database 118. Using m-1 matched objects, for example, the first m-1 best matched objects, are retrieved from the image database 118. These retrieved objects may be referred to as "trap objects" or as other candidate objects. These trap objects resemble the detached object at low-level features, which was used in retrieving these objects. The trap objects undergo processing to increase the semantic difference between the trap objects and the detached object while preserving the similarity in the low level features between the trap objects and the detached object. It is easier for humans to select the right object 210 from the set of candidate objects 206, while bots do not gain any advantage in selecting the detached object from the candidate objects.

If a trap object lacks structures, a visual object with similar low-level features, for example colors, is selected from a list of easily comprehensible objects and embedded into the trap object at a randomly selected location. The purpose of this embedding is to make the resulting trap object appear odd to humans and quickly removed from the potential candidates for the detached object. A list of objects with certain complexity may be selected from the significant objects associated with the images in the database for such a purpose. The objects in the list can be first used in image-based CAPTCHAs as detached objects and selected correctly to increase the possibility that these objects are easily comprehensible by humans. The list of visual objects may be updated constantly. Trap objects are rotated at a random angle, and warped with random warping parameters in a given region to make the trap objects less likely to match a portion of the inpainted image.

As shown in FIG. 2, eight candidate objects at 206 are used in this exemplary image-based CAPTCHA 108. Some of the candidate objects 206 are displayed as circles but would be similar to the cropped object 210. However, the "trap objects" may have odd appearances, such as embedded with a cat, a person's face, a statue, and the like that humans can easily find out that the trap objects don't fit in the displayed image in an image-based CAPTCHA 108.

The user 106 may use a mouse to click on a candidate object and drag it to the region of the inpainted image 208. The object 210 can also be dropped to a certain position of the image. No matter where the object 210 is, dragged or dropped, the resulting composite image is displayed to the user 106 to decide if the object under trail is an authentic object cropped from the image, as well as in the correctly aligned position. A human user 106 may compare the object 210 with the context at the testing location to see if they match well. Only the pixels within the boundary of the inpainted image are displayed. That means the pixels beyond the image boundary will not affect the displayed result. Therefore, the outpainted portion of the detached object would not affect the displayed result when the object was at its due positions.

The image-based CAPTCHA generator module 114 crops n pixels between the detached object and its surrounding context along the direction perpendicular to the contour of the detached object as a buffer region to cut off possible linkage of low-level features between these two regions. This small gap may make the resulting composition image exhibit an unnatural strip along the contour of the detached object when the detached object is correctly aligned with the inpainted image. This may increase the difficulty for humans to find the right alignment position. To mitigate this problem, a strip surrounding the object with a width of n pixels in the direction perpendicular to the contour of the object is cropped no matter where the object moves on the inpainted image, where n is the same number of pixels for the width of the buffer zone between the detached object and its surrounding context in generating the image-based CAPTCHA 108. The value of n may be publically known. The values of the dropped pixels are calculated by using interpolation.

The user interface 200 supports simple drag-n-drop functionality to move the item selected at 210 from the set of candidate objects 206 to the image 204. In some implementations, the item selected at 210 may be highlighted by a box. Next, the user interface 200 presents the item selected 210 in the image 204 for the user 106 to view the composite image.

FIG. 3 shows another exemplary user interface 300 usable by the user 106 to access online applications or services over the network 104. In the exemplary user interface 300, the image-based CAPTCHA 108 is separated in a vertical division. The user interface 300 shows two areas or regions on the display, a right-side region with the image at 302, and a left-side region with the set of candidate objects at 304. The candidate objects are arranged in columns and rows as shown.

A CAPTCHA algorithm employs the surrounding context of the previously cropped from the image 304 to help humans identify the authentic object in solving the image-based CAPTCHA 108. This effectively reduces the requirements on the object in generating the image-based CAPTCHA 108. There is no need to label the images in the image database 118 that are used to generate image-based CAPTCHAs 108 by the generator module 114. The object in the image-based CAPTCHA 108 may not be semantically meaningful itself, but will be when combined with its surrounding context. Humans can correlate the object with its surrounding objects or context and exploit the relationships of the object with neighboring objects to identify which object should be in a position, so that the resulting combination appears natural. Bots lack of such capability. Thus, the human may leverage the context to identify which is the correct object cropped from the image displayed, and to find out its correct alignment position in the inpainted image. This is an advantage of the CAPTCHA algorithm for the image-based CAPTCHA 108 as compared to other image or object based CAPTCHA algorithms.

The tolerance of semantically meaningless objects in the CAPTCHA algorithm also makes it possible to use computers to identify the objects in the image that may be used to generate CAPTCHAs without involving any human. This is another advantage of the CAPTCHA algorithm for the image-based CAPTCHA 108.

The user interface 300 shows a "Submit" field 306 that the user 106 may activate after selecting the item from the set of candidate objects 304 and placing it at a suitable location on the image after visually verifying that the item selected fits or matches surrounding context and the image to be considered has the correct response. The user interface 300 also shows a "Skip" field 308 that the user 106 may select to skip the particular image-based CAPTCHA. Next, the user interface 106 shows a "Help" field 310 to provide guidance to the user 106. This may answer questions about how to solve the CAPTCHA problem, tips in solving a CAPTCHA, session time-out, access to applications and/or services, and the like. The session may have a predetermined time period for the user 106 to select an answer. For example, the predetermined time period may be approximately 10 seconds to approximately 30 seconds, depending on the number of candidate objects. If the user 106 does not make a selection, the application may require the user 106 to pass another image-based CAPTCHA 108 in order to verify if the user is a human or a bot, or close the program or current session.

Figure 4:
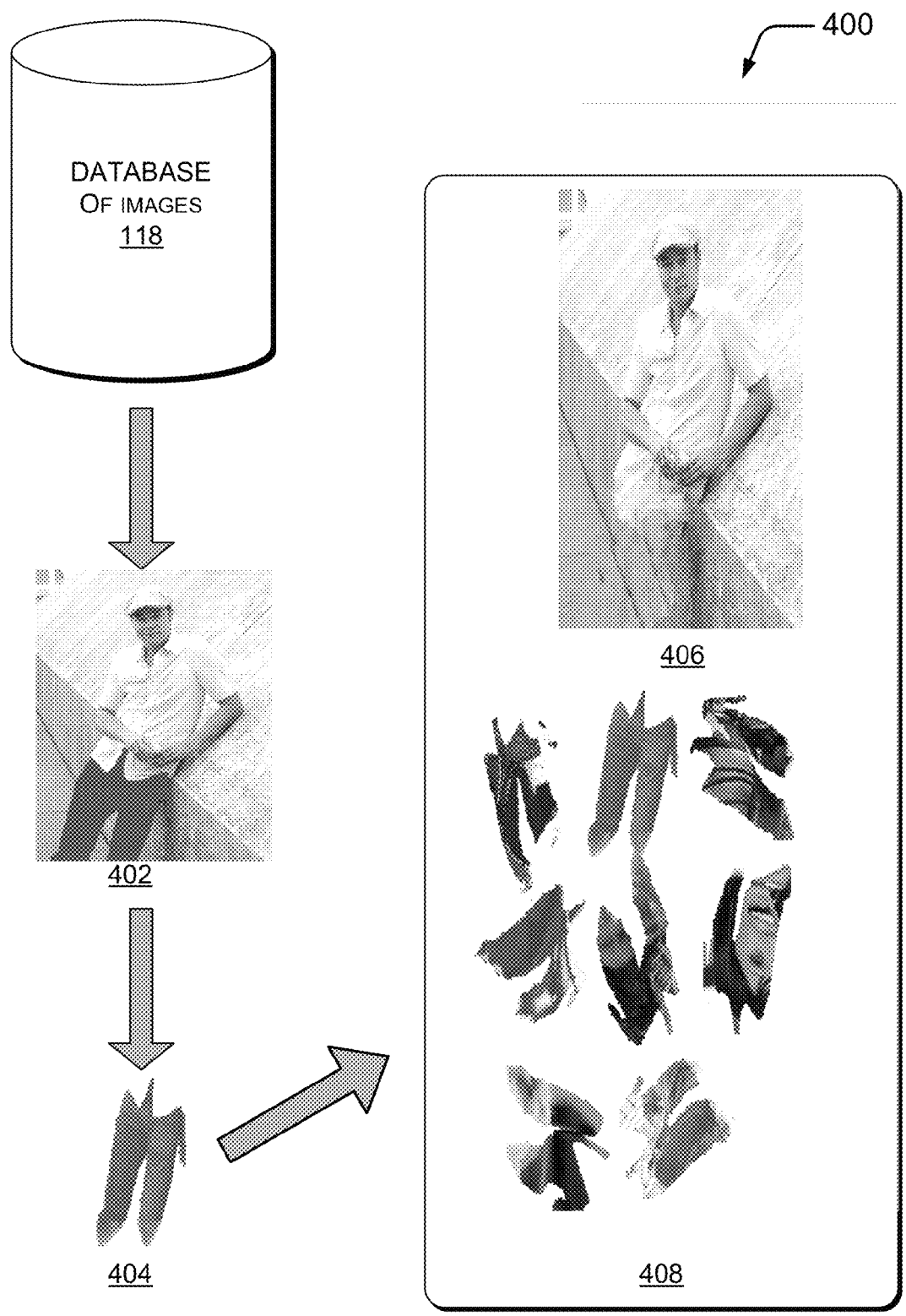
FIG. 4 is a schematic diagram showing an exemplary process of generating the image-based CAPTCHA.

There may be different security levels for the application or service, as determined by the service provider. For example, the application or the service may desire a high level of security. In a high security implementation, the time period for selecting from the set of candidate objects may be shorter than a medium or low level security and different set of images or objects could be used in generating CAPTCHAs of higher security. In addition, large size images and objects tend to help humans easily pass the image-based CAPTCHA test Exemplary Generation of Image-Based Captcha FIG. 4 is a semantic showing an exemplary process 400 for generating the image-based CAPTCHA 108. Images are first collected automatically by the server 112, and then preprocessed to remove the images that do not qualify, such as images that are too small in size compared to a predetermined size. Each image is then segmented into segments. Low-level features such as smoothness, texture, and color difference of neighboring segments may be examined to merge those segments with small differences. Segments smaller than a predetermined threshold are also merged with neighboring segments. The segments are then classified into foreground segments, i.e., objects, and background. Two segments that are not in the neighborhood of each other may be classified into a same object, if they have similar texture, pattern, or other low level features. The contour of each object is then refined with a gradient-based approach to ensure the contour is aligned with edges. Then the objects are assigned values. The value is the estimation of the significance the associated object would be perceived by humans. Objects having significant values are then identified for each image. Each of these objects is compared with the remaining part of the image. Any object that is similar in low level features to some part in the remaining part of the image is removed. All of the survived objects are stored together with the image in the image database 118 at server 112.

To generate the image-based CAPTCHA 108, the image is randomly retrieved from the image database 118, along with its stored significant object(s). In one embodiment, the retrieved image and its significant objects are removed from the image database 118 so that each image will be used only once in the CAPTCHA generation. One of the significant objects is selected at 404, such as pants or slacks on the man. This selected object may be based on a weighted probability that the object with a higher significance value has a greater probability to be selected, equal probability that all of the significant objects have the same probability to be selected, or any other distribution, or a probability that the object to be identified follows a probability distribution of the significant values of the objects. The object, the pants or slacks 404 is cropped from the image. The resulting image 402 has a "hole" which is shown as a region on the image, where the object has been cropped in FIG. 4.

The hole, i.e., the portion or area left by the object, is filled with image inpainting to hide from bots a position of the detached object at 406. The cropped region is expanded by n pixels along the direction perpendicular to the contour of the detached object to remove the pixels neighboring the detached object. These pixels usually carry some similarity with a boundary region of the detached object. Removal of these pixels is to build a safe buffer region between the detached object and the remaining image, which further reduces possible similarity between the detached object and the surrounding pixels that remain in the image. The value of n may be approximately in the range from two to five. A detailed discussion of image inpainting is presented in FIG. 5.

The detached object is compared with the inpainted image, particularly the inpainted region, to determine if there is any similarity in low level features that bots might be exploit to deduce the detached object. If there exists such a similarity, the inpainting is claimed to be unsuccessful, and another significant object of the same image is selected, and the previous techniques of cropping an object and inpainting the cropped region left by cropping are repeated. If all of the available significant objects are exhausted, a current image is dropped, and a new image is retrieved and the same procedure is applied to generate a new CAPTCHA.

If any part of the contour of the detached object is actually part of the boundary of the image, this boundary information leaks information about where the object lies in the original image. The leak is removed by applying a reverse inpainting, i.e., "outpainting", to grow the object beyond the image boundary so that the contour of the object does not convey any image boundary any more. The extra pixels "filled" by the outpainting may be blocked and not displayed when the user 106 aligns the object correction in solving the image-based CAPTCHA 108. In fact, only the pixels inside the boundary of the inpainted image are displayed in solving the image-based CAPTCHA 108.

The detached object, outpainted if necessary, is used to conduct a content-based search of the image database 118 to find portions of images in the database that resemble the detached object. A fixed number of objects similar to the detached object are obtained from the image database 118, processed, and used as "trap objects" to confuse bots. The trapped objects are mixed with the detached object to form the set of candidate objects and displayed at 408 along with the inpainted image 406, from which the user 106 makes an item selection.

The inpainted image and all the candidate objects are scaled by a factor $\alpha$ to remove any possible information leaking that may indicate the location of the inpainted region. The value of $\alpha$ is chosen so that scaling cannot be performed by down or up-sampling. An example value of $\alpha$ may be about 0.9 for downscaling and about 1.1 for upscaling.

Exemplary Image Inpainting

Figure 5:
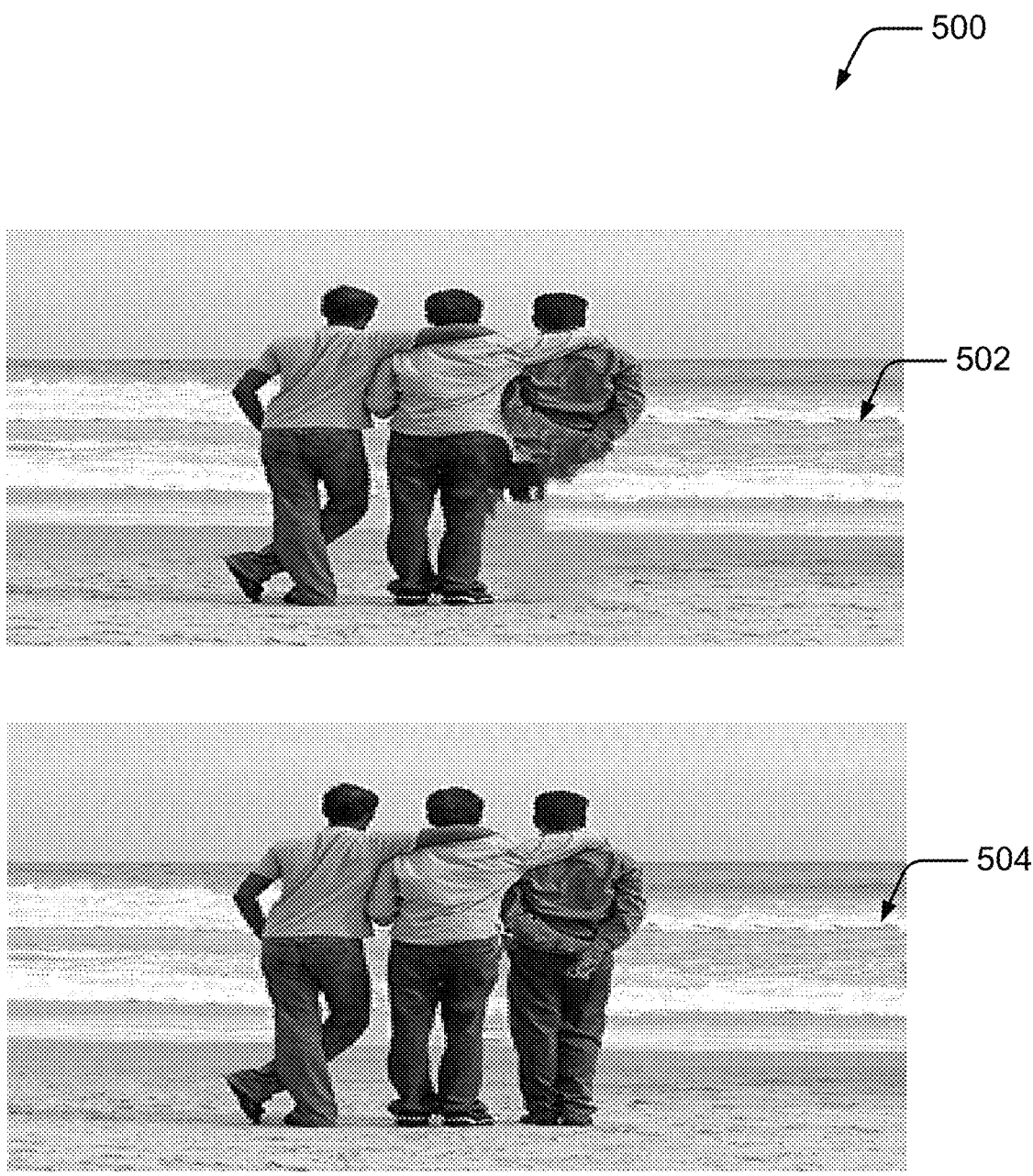
FIG. 5 is a schematic diagram showing an exemplary process of inpainted image.

FIG. 5 is a schematic diagram 500 showing an exemplary process of filling the image that has been cropped. Image inpainting is a technology using the pixels in the uncropped region or other images to fill a cropped region. The filling is completed incrementally. At each step, a boundary block that contains partially unfilled pixels is selected based on certain weighting mechanism. The block is compared with all of the available blocks from the uncropped region of the image or other images, and the best matching block is used to fill the boundary block. Smoothing operation can be used to remove possible boundary between the existing pixels (i.e., the pixels already with values) and filled pixels (i.e., the pixels assigned values in the current step) in the block. Thus, inpainting uses the best matching blocks to fill the region cropped in the image. This may remove most of the low-level features that computers may apply to detect the inpainted region. Some information may still be leaked out that can be used to identify the inpainted region. For example, if blocks are weakly overlapped in inpainting and if the smoothing operation is weak, some pixels in inpainting a block might be a directly copy of other pixels in the image, which might be used by bots to locate the inpainted region. Image inpainting may also leave some sharp changes that resemble part of the contour of the cropped image. To address these issues, an image inpainting algorithm is described below.

If the blocks to fill the cropped region are from the uncropped part of the image, strong overlapping blocks in filling the cropped region may be used. Furthermore, a smoothing operation that would change the values of all the pixels in the block under consideration may be used. These techniques prevent bots from finding the matching blocks used to fill the cropped region, which may be used to deduce where the cropped region is in the image. It is also possible to get the blocks applied to fill the cropped region with image inpainting from a set of undisclosed images with certain similarity to the image to be inpainted. There is also a threshold for a maximum number that a block may be repeatedly selected to fill the cropped region in the image to avoid too many identical blocks in the inpainted region. Blocks to fill at each time may be of variable block size. Initially, the largest block size is tried for the inpainted region. The filling result is checked to see if there exists a long enough sharp edge within a preset distance to a cutoff boundary, resembling the corresponding part of the contour of the detached object. If there is the long sharp edge, the blocks containing the resembling sharp edge are to be refilled with the next largest block size or a smooth operation is applied to suppress the resembling sharp edge.

It is possible that one side of the inpainted image grows faster than the opposite side, resulting in a sharp edge at the opposite side that resembles the corresponding contour of the cropped block. If this occurs, a second filling with a highest priority at the opposite site is used to fill enough distance. The two filling results are then merged so that the second filling result has a highest weight at the boundary of the opposite and the weight is gradually reduced. It is also possible that the part where the opposite growing blocks meet, has a sharp edge that resembles the corresponding contour of the detached object. This problem may be addressed by applying a local smooth operation to suppress the resembling sharp edge or using a different weighting scheme to decide the block to be filled next, so that the different locations are filled at different speeds to avoid a sharp edge resembling the corresponding contour of the detached object.

After inpainting the image with the method described above, the resulting inpainted region is compared with the detached object. If a similarity is too strong, the inpainting is claimed to be a failure; otherwise successful.

After inpainting with the algorithm, possible hints that bots may employ to detect the inpainted region may be removed. The inpainted region is usually easy for humans to detect, as long as the region is sufficiently large, since the resulting region looks odd, unnatural, and the objects in that region are typically distorted, not match the context, or carry no semantic meanings.

In FIG. 5, it is easy for humans to determine that the legs of a person standing on the right side have been inpainted at 502. For convenience, a comparison is shown of the appearance of the inpainted image 502 versus the appearance of the original image 504. This imperfectness in image inpainting may be used to exploit a gap in the capability between humans and bots in identifying inpainted regions.

Exemplary Processes for Image-Based Captcha

Figure 6:
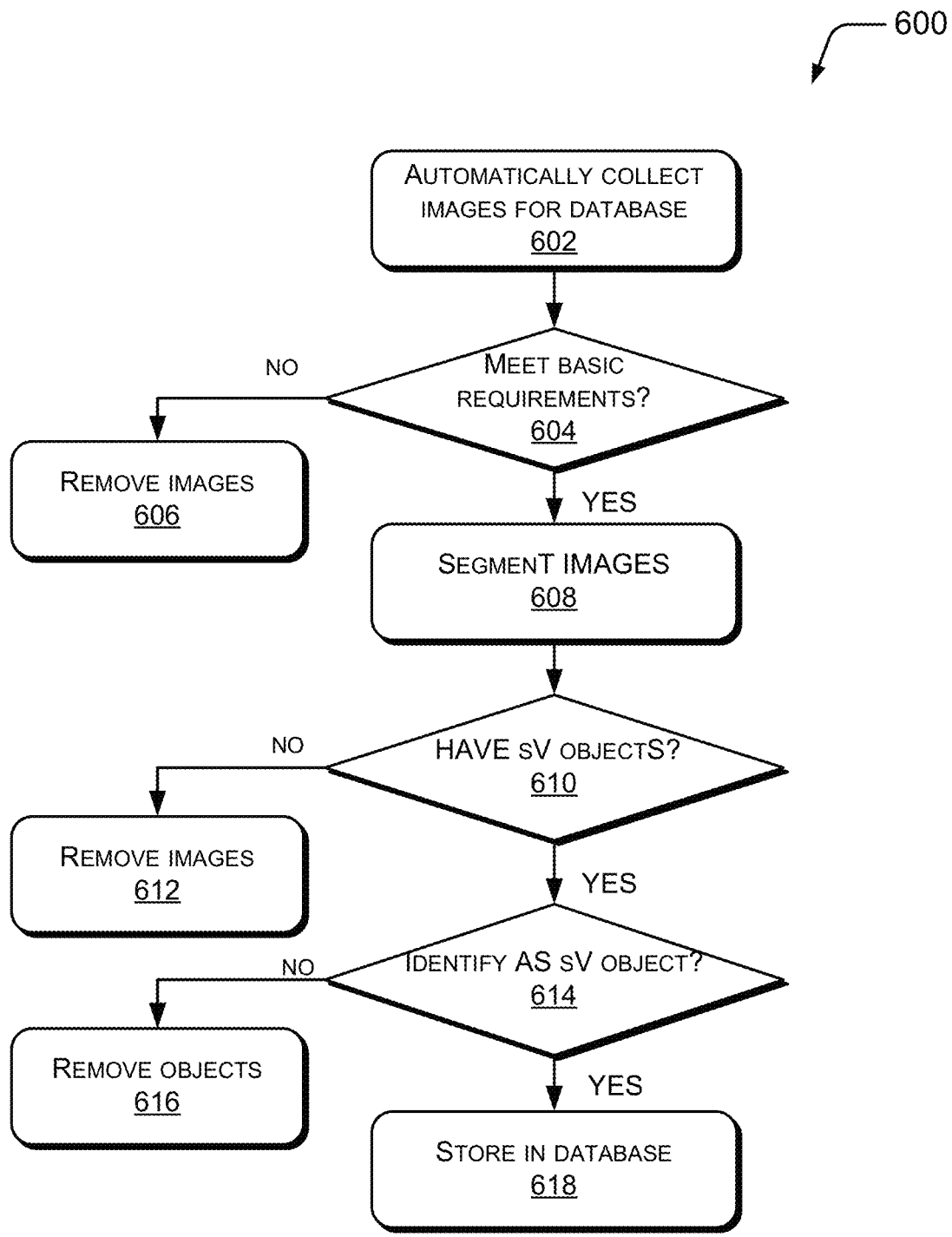
FIG. 6 is a flowchart showing an exemplary process for adding images to a database.
Figure 7:
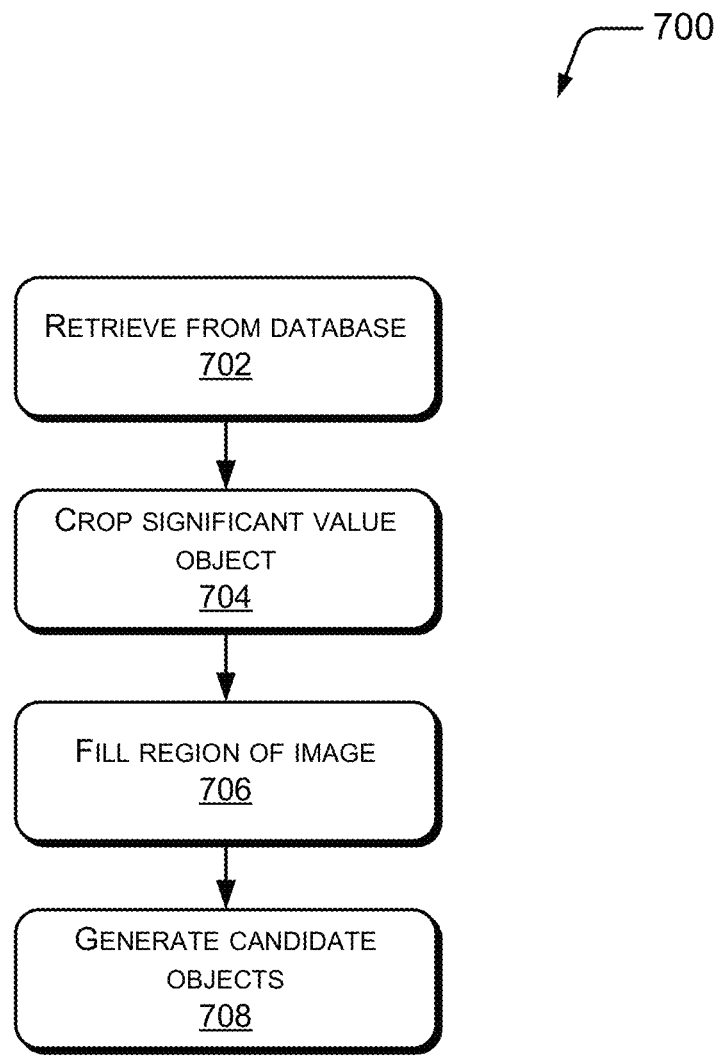
FIG. 7 is a flowchart showing an exemplary process for generating the image-based CAPTCHA.
Figure 8:
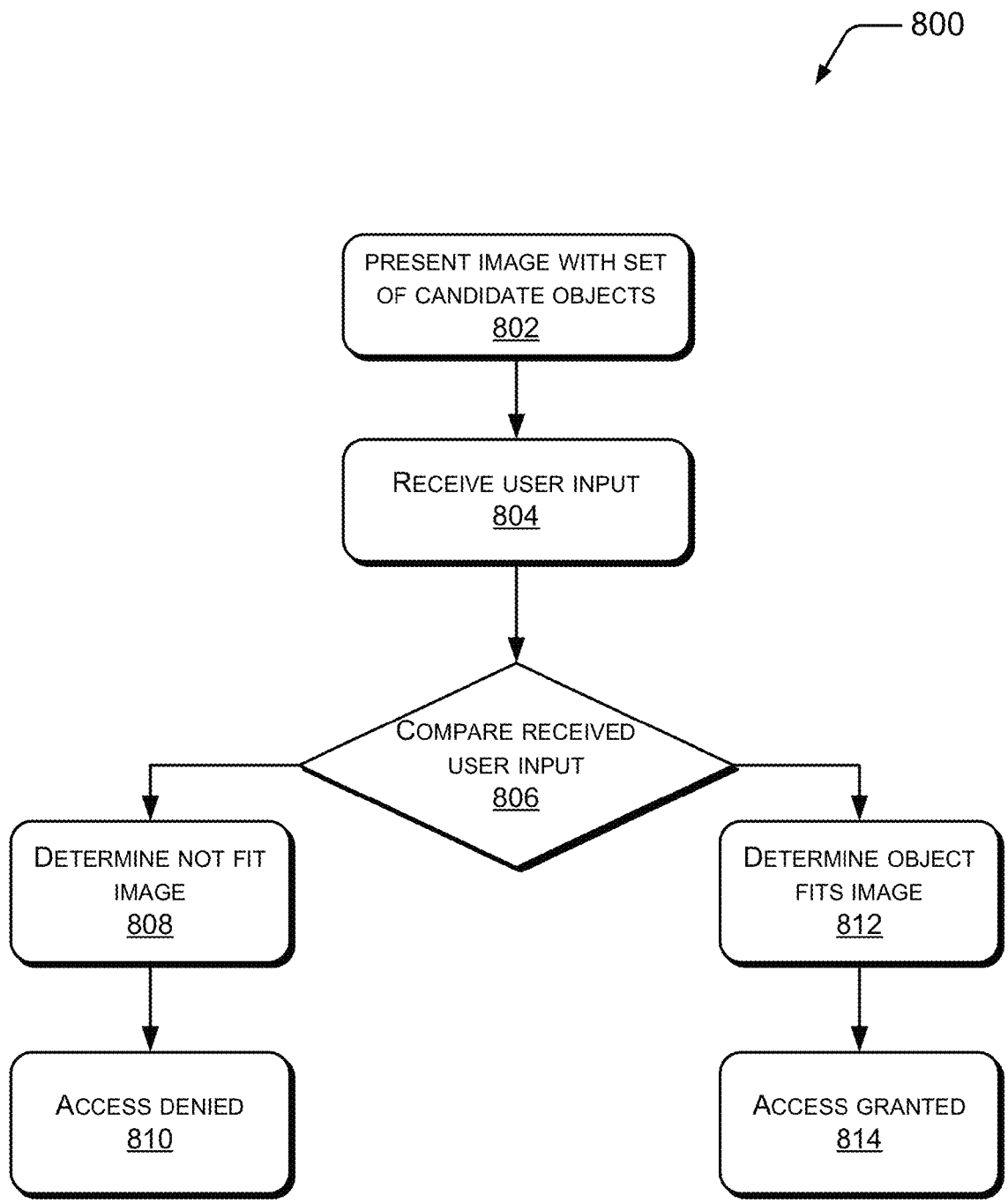
FIG. 8 is a flowchart showing an exemplary process for presenting the image-based CAPTCHA to a user.

FIGS. 6, 7, and 8 are flowcharts showing exemplary processes for adding images to the image database, generating the image-based CAPTCHA, and presenting the image-based CAPTCHA to the user 106, respectively. The processes are illustrated as a collection of blocks in logical flowcharts, which represent a sequence of operations that can be implemented in hardware, software, or a combination. For discussion purposes, the processes are described with reference to the computing environment 100 shown in FIG. 1, the user interfaces shown in FIGS. 2-3, and the inpainted image shown in FIG. 5. However, the processes may be performed using different environments and devices. Moreover, the environments and devices described herein may be used to perform different processes.

For ease of understanding, the methods 600, 700, and 800 are delineated as separate steps that are represented as independent blocks in FIGS. 6, 7, and 8. However, these separately delineated steps should not be construed as necessarily order dependent in their performance. The order in which the process is described is not intended to be construed as a limitation, and any number of the described process blocks may be be combined in any order to implement the method, or an alternate method. Moreover, it is also possible that one or more of the provided steps will be omitted.

FIG. 6 is a flowchart illustrating an exemplary process 600 executed by computer instructions using an algorithm for adding images to the image database. The process 600 collects images and add images to the image database 118 in an automatic manner. The images in the image database 108 do not need to be labeled, so the images may be added in a fully automatic manner. Images are collected at block 602. There are a variety of sources to collect images from: may come from a database of privately collected images, may be crawled from the Internet, may be from querying descriptive keywords to an image search engine, and/or may be collected from difference sources.

Crawling from the Internet is one way to build a scalable image database for the image-based CAPTCHA algorithm. There may be a huge amount of images found in the Internet. A large amount of new images are added to the Internet constantly. These factors make the Internet an ideal source to build the image database 118, with continuous influx of new images and instant removal of used images. In one embodiment, each image is used to generate only one image-based CAPTCHA 108. No image is repeatedly used in the CAPTCHA algorithm for security purposes. The huge amount of Internet images combined with the very nature that content-based image retrieval at the Internet scale of images is still in its infancy makes the Internet an ideal case to convert public Internet images into a secret database needed to generate the image-based CAPTCHA 108. Thus, this makes it difficult to locate the original Internet image that the algorithm used to generate the image-based CAPTCHA 108, in the duration before the current CAPTCHA session expires.

Images may be crawled from the Internet with a homebuild crawler or with an image search engine. For the latter case, a list of descriptive words or keywords is provided to the image search engines. The descriptive words are used to collect a large set of images with sufficiently high entropy instead of labeling images as other proposed image or object based algorithms since the algorithm does not need the images in the image database are labeled.

The process 600 determines at block 604 whether an image automatically collected at block 602 meets the basic requirements. The basic requirements can be that an image must be larger than a minimum image size, has a sufficient number of bits in color depth, contains sufficiently complex structures (i.e., the entropy is sufficiently high), and the like. If the image is determined to not meet the basic requirements at block 604, the process 600 proceeds to the left side, which removes the unsuitable images at 606. For example, images with the image size less than 166×166 pixels may be considered too small and therefore removed from the collected images. If an image is too small, the generated CAPTCHA 108 may have low human accuracy rate and long response time such as more than 30 seconds.

Returning to block 604, if the images processed at block 604 are determined to satisfy the basic requirements, the images are preprocessed further. If an image has a size larger than a predetermined largest image size, the image is cropped at a position that retains most structured components. The ideal image database for the CAPTCHA algorithm is that each image in the database contains several semantically meaningful objects with a strong position correlation semantically. In addition, humans may easily identify the cropped object based on the strong position correlation of the objects, and the database has sufficiently high entropy. A long list of meaningful and descriptive words input to the image search engine helps collect images that satisfy the criteria.

Proceeding to block 608, the process 600 segments the images that are considered suitable for use. The process 600 first segments an image into segments, and then groups neighboring segments into objects and the background. An object on touching one or more boundaries of the image is still a valid object. The goal is to partition the image into objects, and then "perceptually" significant objects may be identified, so that one of them may be used to generate the image-based CAPTCHA 108 in the future.

To facilitate a quick and easy matching of the object with its context, the object to be cropped in generating a CAPTCHA 108 should not be too small or too large. If a segmented object is too small, it is merged with the most similar neighboring object. If the object is too large, it is partitioned into two separate objects by considering the shape and area of the resulting objects and also by separating along the parts that are not similar, as close as possible. Furthermore, the process 600 desires a maximum value of a distance transform of each object be larger than a predetermined threshold. This implies that each object may have at least one inside pixel whose distance to the closest boundary pixel of the object may be larger than the predetermined threshold. In other words, each object may be able to enclose completely at least a circle with sufficiently large radium.

Another option for object segmentation is that the boundary of the object may be selected in such a way that there exists no similarity of low-level features on both sides of the boundary. The CAPTCHA algorithm may choose the partition that minimizes such similarity of low-level features on both side of each object boundary. The problem is that there may be some similarity of low-level features of the object and its surrounding context is not as severe as it may look like. For example, in generating the image-based CAPTCHA 108, a buffer region surrounding the cropped object is also cropped before inpainting in order to remove residue similarity of low-level features of the object and the uncropped surrounding context. This may make it more difficult for bots to find and to exploit the similarity to choose the right object or to find the location of the object in the inpainted image.

The process proceeds to block 610, which calculates a significant value for each of the objects segmented. This significance value is to estimate how important the object will be perceived by humans. Each object in the image is then assigned with its calculated significant value. If there are images having too small a number of significant objects, whose significant values are larger than a predetermined threshold, the images are removed at 612. Returning to block 610, when the objects have significant values that are larger than a predetermined threshold, the objects may be considered as significant objects. Significant objects in each image are recorded for future CAPTCHA generation.

The process at block 614 identifies the objects with the significant values for the image-based CAPTCHA 108. Each object with the significant value that is larger than a predetermined threshold is selected and compared with the image, excluding the object, to find out if the object has any significant similarity in low-level features with any part of the remaining image.

If an object is similar to some part in the remaining image, the object is not suitable for the image-based CAPTCHA 108. The process 600 removes the object at 616.

Returning to block 614, if the object is not very similar to any part in the remaining image, the object is considered suitable. If there is a suitable object that survives after the above process, the image and its associated surviving significant objects and significance values are inserted into the image database 118 at block 618. These objects together with the image will be used in future by the image-based CAPTCHA generator 114 to generate the image-based CAPTCHA 108.

FIG. 7 is a flowchart illustrating an exemplary process 700 for generating the image-based CAPTCHA 108. This process may be described as part of the processes described in FIGS. 4 and 5.

The process 700 retrieves an image and its associated significant objects from the image database 118 at block 702. Next, the process 700 selects an object from the set of retrieved significant objects associated with the retrieved image and crops the object from the image at block 704. If the object touches one or more boundaries of the image, the part that touches the image boundary is expanded beyond a boundary of the image by outpainting. This object expansion hides the information that part of the contour of the object is aligned with some image boundary that otherwise bots may be use to deduce the right object from the candidate objects. As previously discussed in FIG. 4, the image is randomly selected and retrieved from the image database 118. In one embodiment, the retrieved image and its associated objects are then removed from the image database 118 to ensure that one image is used to generate only one CAPTCHA 108, and no two CAPTCHAs are generated from the same image. Only one of the significant objects is selected to generate the image-based CAPTCHA 108. This selected significant object may be based on a weighted probability that the object with a higher significant value has a higher probability of being selected, or equal probability that all the significant objects have the same probability to be selected, or any other distribution.

At block 706, the process 700 first expands the cropped region left by the detached object by cropping a strip of n pixels in width around the boundary of the cropped region. This is to remove any residue similarity of low-level features between the detached object and the remaining part of the image, particularly around the neighboring regions of the detached object and the uncropped part of the image. The process 700 then fills the cropped region on the image, where the pixels have been cropped, with image in painting. The process 700 uses the remaining part of the image or a set of images for image in painting. Image in painting was discussed in detail in FIG. 5.

At block 708, the process 700 generates other candidate objects, i.e., trap objects, by retrieving objects similar in low-level features to the object cropped from the image from the image database, and then processing the retrieved objects with random rotation, embedding a human-easily comprehensible object if needed, and warping. The low level features are features that are defined and extracted without using human perception. The detail of the operations in block 708 was previously discussed in FIGS. 2 and 4.

At block 710, the inpainted image and all the candidate objects are scaled in size by a scaling factor $\alpha \neq 2^r$, $r \in N$, where N is the set of integers to remove any possible information leaking indicating the inpainted region. This scaling operation was discussed in detail in FIG. 4.

FIG. 8 is a flowchart illustrating an exemplary process 800 executed by computer instructions using the algorithm for presenting the image-based CAPTCHA 108 to the user 106. The process 800 presents the image and a set of candidate objects in block 802. The set of candidate objects include the object cropped from the image and the other candidate objects for object recognition in the image-based CAPTCHA 108.

In order for humans to solve the image-based CAPTCHA 108, the user 106 locates the inpainted region. Next, the user 106 compares the surrounding context of the inpainted region with each of the candidates to find the best match. The process 800 receives input to the user interface 804 indicating a selection item from the set of candidate objects, and possibly additional input indicating the location where the selected object is placed in the inpainted image to make the resulting composite image appear natural and semantically meaningful.

As mentioned, the image-based CAPTCHA 108 is a type of challenge-response test to verify if a response is generated by a human or by a bot. The image-based CAPTCHA 108 allows the human to leverage the context in the image surrounding the inpainted region to identify which is the correct object cropped from the image displayed. This is an advantage of the image-based CAPTCHA 108.

Proceeding to block 806, the process evaluates the user input received on the user interface. An item is selected from the set of candidate objects. If the selected item is not the object cropped from the image, or if the selected item is the correct object but it is placed at an incorrect position on the image, the process 800 proceeds along the left side to block 808. The process 800 in block 808 concludes that the answer is wrong and the user 106 has failed the test. The process 800 presumes the response is from a bot instead of the human. Thus, access may be denied to an application and/or service at block 810.

Returning to block 806, if the selected item is the detached object and is placed at the right alignment position on the image, the process 800 proceeds along the right side to block 812, where the process 800 concludes that the answer is correct and the user has passed the test. The process 800 presumes the response is from a human. Thus, access may be granted to the application 814.

As discussed above, certain acts in processes 600, 700, and 800 need not be performed in the order described, may be modified and/or may be omitted entirely, depending on the circumstances. The process described collects images automatically, preprocesses the images, segments the images into objects, with each object assigned a value, which is an estimation of significance perceived by humans, and adds images with their respective significant objects to the image database for generating image-based CAPTCHAs in the future. The process further retrieves an image and its significant objects from the image database, crops the image from the image, inpaints the cropped region, extracts a certain number of objects similar to the detached object from the image database, processes them to form trap objects, and scales the inpainted image and the trap and detached objects to generate an image-based CAPTCAHA. The process finally collects the input from a user, and evaluates if the selected object is the detached object or not, and if the selected object is placed at the correct alignment position to determine if the user is a human or a bot. The process manages security for service providers without sacrificing service quality to the user 106.

Exemplary Server Implementation

Figure 9:
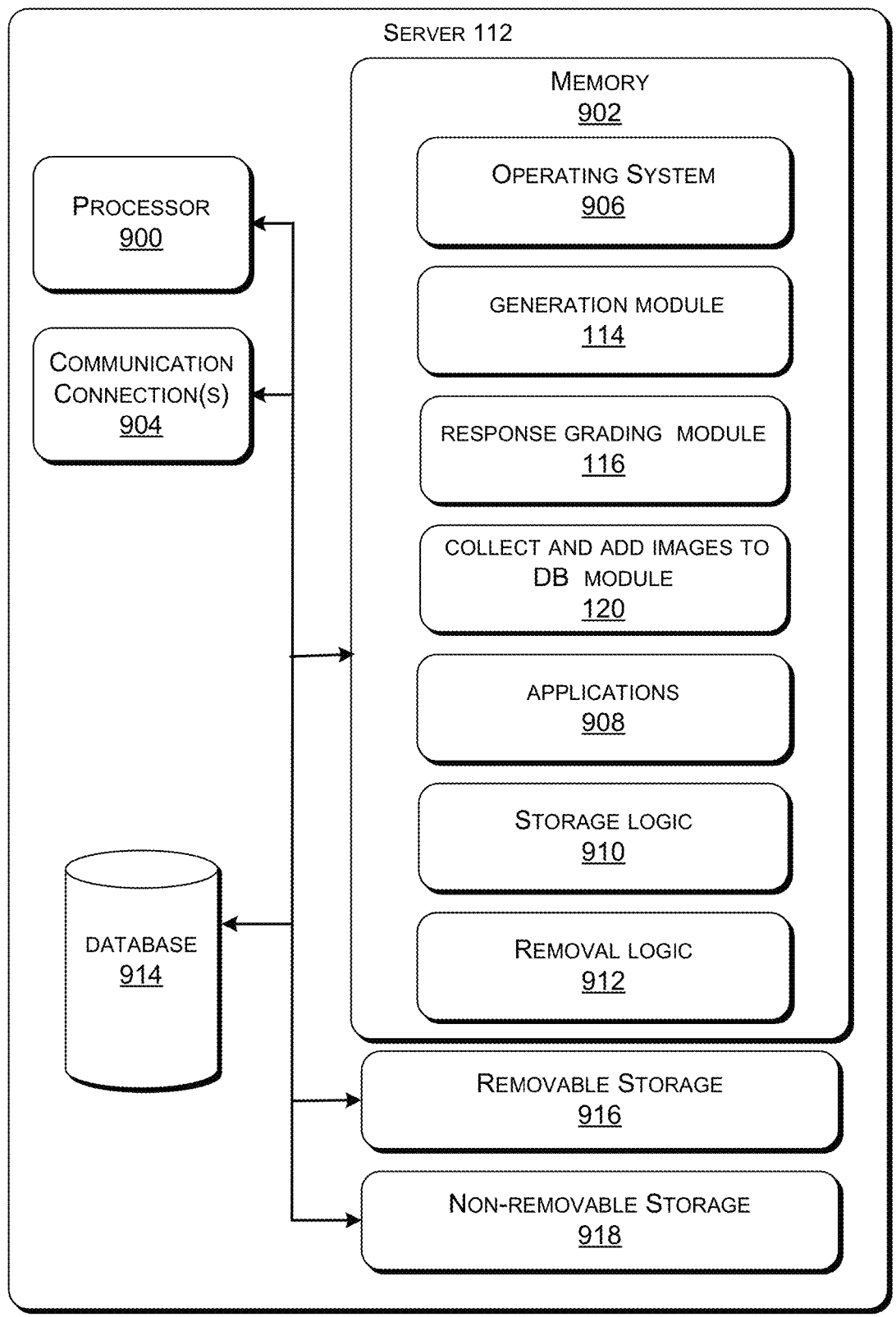
FIG. 9 is a block diagram showing an exemplary server of the system of FIG. 1.

FIG. 9 is a block diagram showing details of an exemplary server 112. The server 112 may be configured as any suitable system capable of managing content, which includes, but is not limited to, implementing the image-based CAPTCHA 108 for security purposes, such as to grant access or to deny access to the content. In one exemplary configuration, the server 112 comprises at least one processor 900, a memory 902, and a communication connection(s) 904. The communication connection(s) 904 may include access to a wide area network (WAN) module, a local area network module (e.g., WiFi), a personal area network module (e.g., Bluetooth), and/or any other suitable communication modules to allow the server 112 to communicate over the network(s) 104 with other computing devices and servers.

Turning to the contents of the memory 902 in more detail, the memory 902 may store an operating system 906, the server-side image-based CAPTCHA generation module 114, the response grading module, the collect and add image module 120, and one or more applications 908 for implementing all or a part of applications and/or services using the image-based CAPTCHA 108. As mentioned previously, the applications and/or services may be operating on separate servers.

The one or more other applications 908, computer instructions, or modules may include an email application, online services, bank accounts, tax records, a calendar application, a navigation module, a game, and the like. The memory 902 in this implementation may also include a storage logic 910, a removal logic 912, and a image-based CAPTCHA database 118.

The storage logic 910 determines suitable storage options and locations for the objects and images selected for the image-based CAPTCHA 108. The storage logic 910 is based at least in part on the weighted probability that the object with a higher significance value has a greater probability of being selected for the object recognition. Thus, the storage logic 910 determines the storage actions that may be performed on the objects and the images based on the weighted probability for the object. The storage logic 910 manages storage options for the content, such as the objects and images stored in the image-based CAPTCHA database 118 or alternatively on a separate database. The storage logic 910 may also communicate with one or more local and/or remote servers, and/or other network storage (not shown) to identify additional or other storage locations.

In some implementations, the storage logic 910 may identify new storage actions to be performed, identify storage locations that are no longer applicable to be removed from the list of available storage locations, and provide a list of storage locations.

The removal logic 912 identifies the images that are to be removed, eliminated, or deleted, such as image-based CAPTCHAs that have been used. In particular, the removal logic 912 determines removal or deletion actions that are to be performed on the images, based on at least in part on the image-based CAPTCHA having been used.

The server 112 may also include additional removable storage 914 and/or non-removable storage 916. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be a part of, including but not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable storage media.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer storage device storing computer-executable instructions that, when executed, perform acts comprising:
    displaying, on a device interface, an image and a set of candidate objects for object recognition, the set of candidate objects including a specific candidate object and one or more other candidate objects, the specific candidate object corresponding to a missing portion of the image, the one or more other candidate objects including at least a first candidate object that does not correspond to the image;
    detecting a selection of a candidate object from the set of candidate objects; and
    determining whether the selection was made by a human based on whether the candidate object corresponds to the specific candidate object.

2. The computer storage device of claim 1, wherein the determining includes:
    determining that the selection of the candidate object is made by a bot in response to identifying the candidate object selected as different from the specific candidate object; or
    determining that the selection of the candidate object is made by a human in response to identifying the candidate object as the specific candidate object.

3. The computer storage device of claim 1, further comprising:
    segmenting the image into objects;
    assigning a value of significance to each of the objects;
    determining that one or more of the objects are significant by determining that each of the one or more objects has an assigned value that is greater than a threshold;
    removing the one or more of the objects that are significant in response to determining that a corresponding object includes low level features that are similar to additional low level features in the image; and
    adding a remaining significant object into a database as one of the set of candidate objects.

4. The computer storage device of claim 1, further comprising calculating an additional value for an object, the additional value based at least in part on an estimation of a probability that the object is recognizable by humans.

5. The computer storage device of claim 1, further comprising:
    retrieving the image and objects segmented from the image from a database; and
    cropping an object from the image, wherein the image surrounds the object and the image visually associates the object as a part of the image.

6. The computer storage device of claim 5, further comprising:
    filling a cropped portion of the image; and
    generating the one or more other candidate objects such that each candidate object has a first shape and a first size similar to a second shape and a second size of the object cropped from the image.

7. The computer storage device of claim 1, further comprising:
    evaluating the candidate object based on an aligned position of the candidate object with respect to a position of a cropped object in the image:
    in response to determining that the aligned position of the candidate object does not match the position of the cropped object in the image, denying accessing to an application; and
    in response to determining that the aligned position of the candidate object matches the position of the cropped object in the image, granting access to the application.

8. The computer storage device of claim 1, wherein the image is obtained by one of crawling for the image from an Internet, querying for the image using keywords for the image through a search engine, or obtaining the image from a private collection.

9. A system, comprising:
    one or more processors;
    one or more modules stored in the memory and executable by the one or more processors to:
    display an image in a first display area, the image having a missing object and an area of the image with the missing object filled in with image inpainting;

display a set of candidate objects in a second display area, the set of candidate objects including the missing object distributed among other candidate objects, display the image with a candidate object selected from the set of candidate objects in the first display area in response to a drag and drop of the candidate object into the first display area, evaluate the candidate object with respect to the image based on visual recognition;

determine that the candidate object is selected by a bot in response to identifying the candidate object as not belonging to the image; and determine that the candidate object is selected by a human in response to identifying the candidate object as the missing object that belongs in the image.

10. The system of claim 9, wherein display of the set of candidate objects includes displaying the set of candidate objects arranged in a carousel formation.

11. The system of claim 9, wherein display of the set of candidate object includes displaying the set of candidate objects arranged in columns and rows.

12. The system of claim 9, further comprising:

detect an aligned position of the candidate object with respect to a position of the missing object in the image;

in response to determining that the aligned position of the candidate object does not match a position of the missing object in the image, deny access to an application; and in response to determining that the aligned position of the candidate object matches the position of the missing object in the image, grant access to the application.

13. The system of claim 9, wherein the image inpainting provides unnatural details that hint to a human that the candidate object belongs in the area filled with the image inpainting.

14. The system of claim 9, wherein the set of candidate objects share one or more low level features, the low level features including smoothness, texture, and color difference of neighboring segments.

15. The system of claim 9, wherein the candidate object includes semantic information that is different from semantic information of other candidate objects.

16. A computer-implemented method, comprising:

displaying, on a device interface, a set of candidate objects for object recognition and an image having a missing object, the set of candidate images including the missing object and a first candidate object, wherein the first candidate object does not correspond to the image;

detecting a selection of a candidate object from the set of candidate objects; and determining whether the selection was made by a human based on whether the candidate object corresponds to the missing object.

17. The computer-implemented method of claim 16, wherein the determining includes:

determining that the selection of the candidate object is made by a bot in response to identifying the candidate object as different from the missing object; or determining that the selection of the candidate object is made by a human in response to identifying the candidate object as the missing object.

18. The computer-implemented method of claim 16, further comprising:

detecting an aligned position of the candidate object with respect to a position of the missing object in the image; and in response to determining that the aligned position of the candidate object does not match a position of the missing object in the image, denying access to an application; and in response to determining that the aligned position of the candidate object matches the position of the missing object in the image, granting access to the application.

19. The computer-implemented method of claim 16, wherein an area of the image that surrounds the missing object includes image inpainting that provides unnatural details, the unnatural details hinting to a human that the candidate object belongs in the area filled with the image inpainting.

20. The computer-implemented method of claim 16, wherein the set of candidate objects share one or more low level features, the low level features including smoothness, texture, and color difference of neighboring segments, and wherein the candidate object includes semantic information that is different from the semantic information of other candidate objects in the set of candidate objects.

* * * * *